Figure 1:
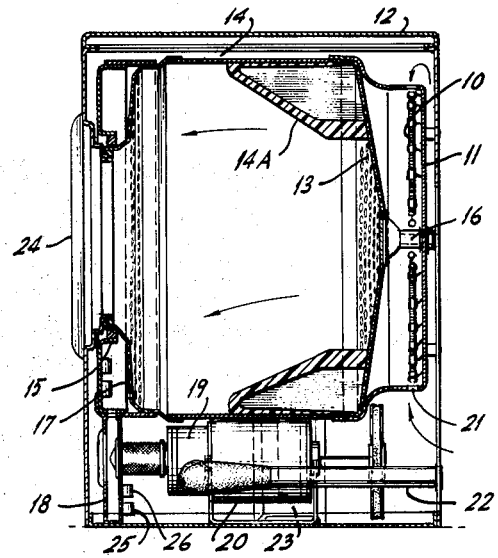

May 31, 1966   M. P. GOSNELL   3,253,346
LAUNDRY MACHINE
Filed April 9, 1962   2 Sheets-Sheet 1

INVENTOR.
MICHAEL P. GOSNELL
BY
F.D. Rogers
ATTORNEY

INVENTOR.
MICHAEL P. GOSNELL
BY
F.D. Prager
ATTORNEY

# United States Patent Office 3,253,346
Patented May 31, 1966

3,253,346
LAUNDRY MACHINE
Michael P. Gosnell, Philadelphia, Pa., assignor to Philco Corporation, Philadelphia, Pa., a corporation of Delaware
Filed Apr. 9, 1962, Ser. No. 185,910
1 Claim. (Cl. 34—45)

This invention relates to dryers, especially dryers which utilize an automatic "cycling" heater system for the drying of fabrics by a current of air.

The automatic cycling of such a system, that is, turning the heater "on" at a predetermined relatively low temperature and switching it "off" at a higher temperature, is conveniently achieved by a thermostat; however, some further control is needed for terminating the cycling when a load of fabrics has been dried sufficiently. Somewhat advanced devices have either allowed a predetermined, suitably counted number of heater cycles, or have terminated the operation after some predetermined total of cycling time or of heating phases or cool-down phases thereof. It has, however, been difficult to predetermine such times, or numbers, or similar values; too many variables are encountered in operation. Among these variables are, different initial water contents of fabrics to be dried, different desired ultimate dryness or dampdryness of fabrics, different water retentions and other characteristics of fabrics, different size of load, different temperature or humidity of ambient air, etc. It has been attempted to use further condition responses, for instance by sensing humidity or dryness of the fabrics themselves, combined with the sensing of air temperatures; however, each added device installed for response to changeable media is a significant expense item, and yet such added devices are generally far from providing such reliability and simplicity as is needed in machines of this type. It has therefore been an object of the invention to provide improved and simplified control of a dryer cycling system adaptable to variations as outlined.

Toward this objective the invention provides a new system terminating the drying operation when the measurement of certain effects of the fabrics drying operation has reached a predetermined value. Briefly stated, the new system measures a function of the way and rate at which heat is exchanged between the fabrics to be dried and the air current. More particularly it measures an electrical function of the rate of such transfer. Advantageously, the system provides successive electrostatic charges, each in effect integrating the dissipation of sensible heat occurring during the cool-down phase of one cycle, and the system then utilizes such electrostatic charge to terminate the cycling.

The rate of heat dissipation is known to vary between successive cool-down phases of the cycling dryer operation, in keeping with changing conditions which include mainly the presence of different percentages of retained humidity in the fabrics. When retained humidity is high, each portion of air which passes through the fabrics during a cool-down phase picks up a high component of latent heat and a correspondingly low component of sensible heat; therefore, successive portions of such air show rapid reduction of sensible heat—they have temperatures falling rapidly from one predetermined level to another. When the drying air current, later on, passes through fabrics which already are relatively dry and which contain less latent heat, the temperatures of the air current fall more slowly between the same temperature levels.

Reliance on the rate of cool-down alone is not preferred in accordance with this invention, for the reason that such rate can at least transiently be affected or disturbed by various disturbing factors, such as changes of ambient air temperature, different characteristics of successive fabric loads, etc. The invention therefore provides a system which derives a measurement and specifically an electrical equivalent not merely from a momentary rate of cool-down, or from local slope of the corresponding curve, but from the length and averaged slope of such curve encountered in a cold-down phase, in other words from integration of the rate of drop of temperatures. Accumulation of an electrostatic charge is an especially convenient way to measure such integrated value, between predetermined upper and lower temperatures, and is therefore preferred.

Figure 2:
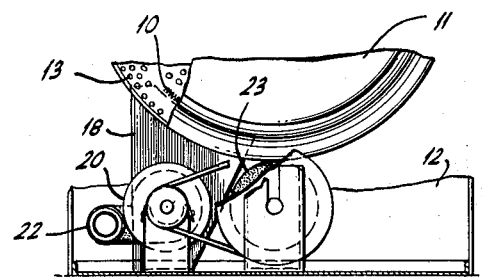
Figure 4:
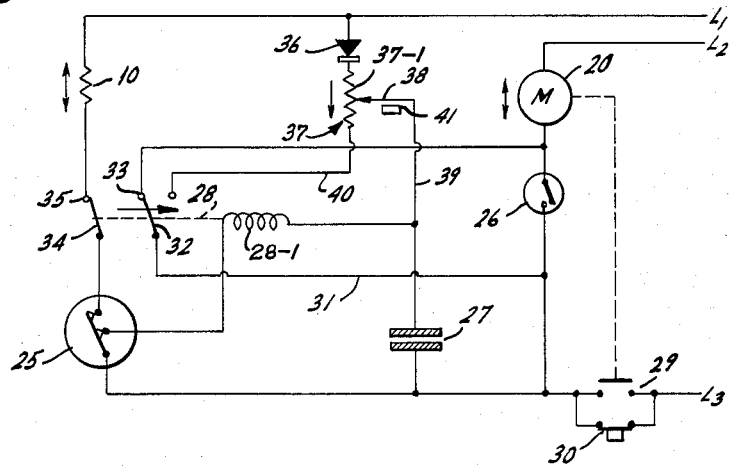
Figure 3:
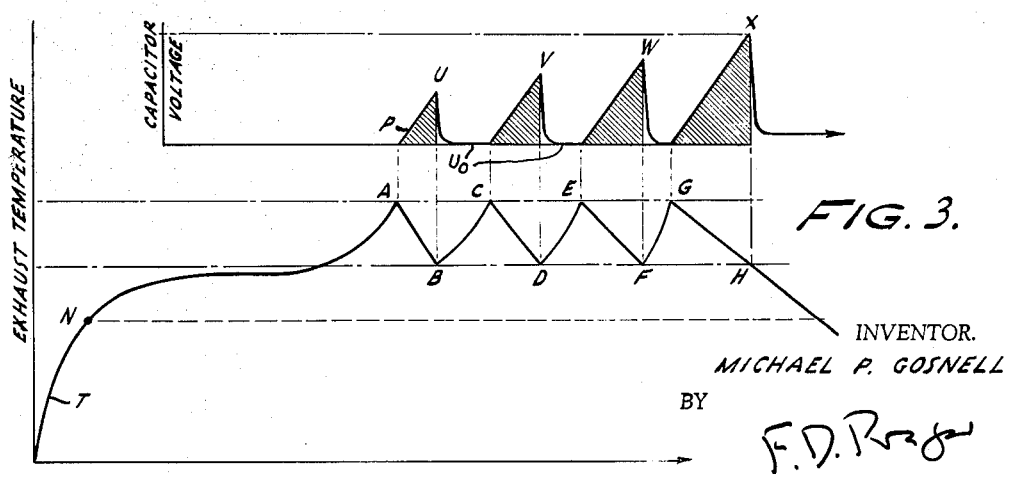
Figure 5:
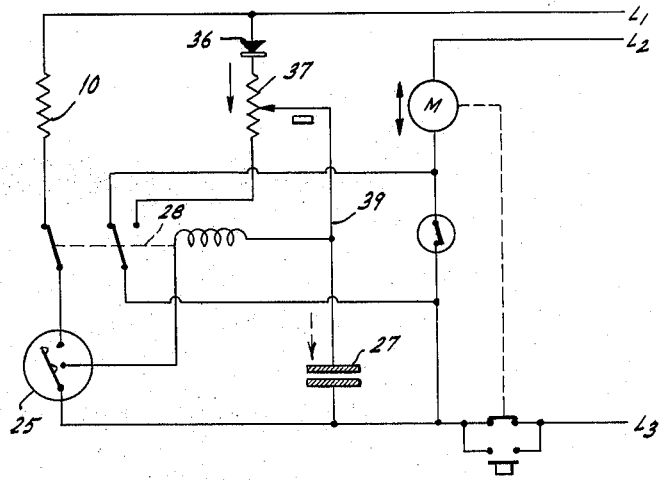
Figure 6:
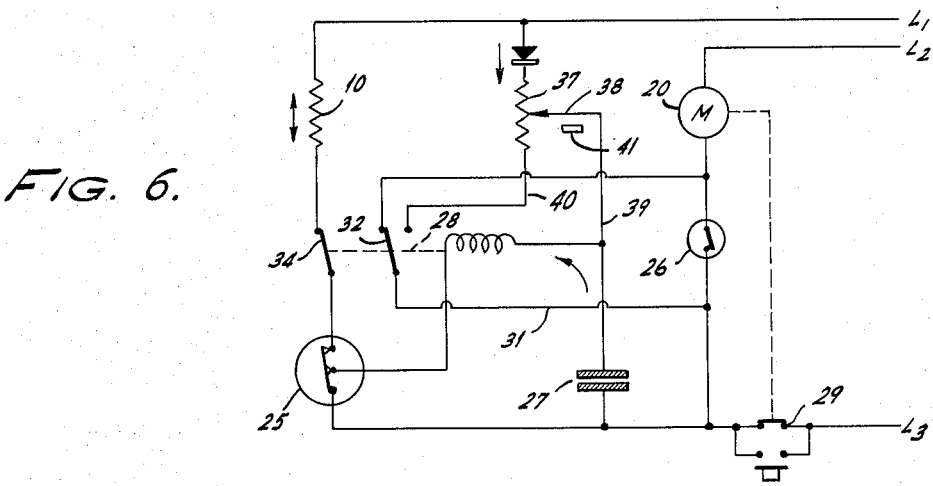
Figure 7:
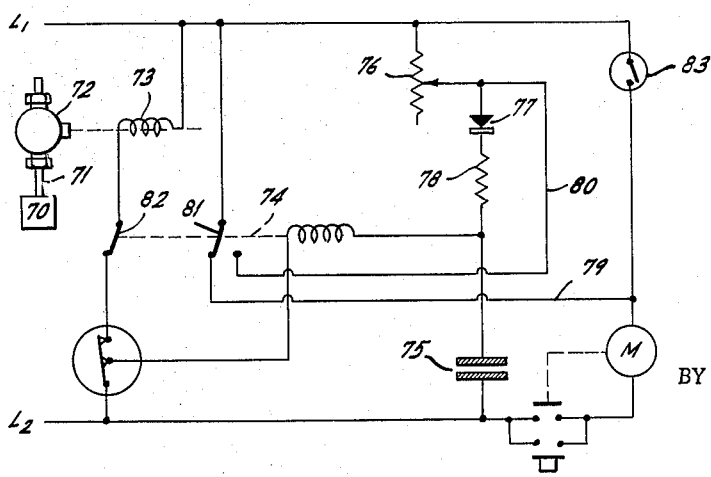

These and other features of the invention, as well as their advantages, will be understood when certain preferred embodiments are considered, which are therefore shown in the drawing appended hereto. FIGURE 1 is a generally central sectional elevation of a dryer incorporating this invention. FIGURE 2 is a fragmentary rear view of the same machine. FIGURE 3 is a chart of exhaust air temperatures and related capacitor potentials as successively obtained in accordance with this invention. FIGURES 4 to 6 are diagrams showing different operative conditions of an electric circuit which forms part of the machine. FIGURE 7 is a similar circuit diagram for a slightly modified machine.

Referring first and for general orientation to FIGURES 1 and 2: electric heater 10 is rigidly installed in rear section 11 of dryer cabinet 12. A perforated rear wall 13 of a rotatable dryer drum 14 is disposed opposite the heater, this drum having tumbling vanes 14a and being supported by bearing structures 15 and 16 which are disposed respectively in front and rear thereof. A perforated front wall 17 of the drum is faced by a duct structure 18 and air is exhausted from this duct structure by a blower 19, actuated by motor 20, whereby an air current is caused to pass into apertures 21 in the wall of rear section 11, then over heater 10, through perforated rear wall 13 into drum 14 to provide a generally horizontal current, see the arrows in FIGURE 1, and thus to dry the fabrics tumbling in the drum. Used air is withdrawn through perforated front wall 17, duct structure 18, blower 19, and blower exhaust duct 22. It will be understood that motor 20 rotates drum 14, for instance by means of a roller 23 best shown in FIGURE 2, and that the fabrics are initially deposited in drum 14 through a front door 24 shown in FIGURE 1. Duct structure 18 is shown as having a cycling thermostat 25 and a cooldown thermostat 26 installed therein, these two thermostats being exposed to the circulating air and being in electric circuit with capacitor and relay means 27, 28 (FIGURE 4) to provide the new control system.

An initial phase of the operation of this system is shown in FIGURE 3, at left, where the temperature T of the air current is relatively low, being approximately equal to the ambient temperature. As shown in FIGURE 4, heater 10 and motor 20 are de-energized during this initial phase, the circuits of both devices being interrupted by a normally open main switch 29. In order to start the dryer the user momentarily depresses a push button 30, thereby closing an electric shunt around main switch 29. This causes alternating curent (see the doubleheaded arrows) to flow (a) from $L_1$ through heater 10, relay switch pole 34 (normally closed at terminal 35 as shown) and cycling thermostat 25 (normally closed) to $L_3$ and (b) from $L_2$ through motor 20 and a bypass circuit 31 (around the normally open cool-down thermostat 26, this bypass circuit including another switch pole 32 in relay 28 which pole is then at terminal 33 as shown). The motor accordingly starts rotating the dryer drum and while the motor operates it also closes main switch 29 and maintains it closed by means of suitable linkage, suggested by broken lines, so that the heater and motor remain energized when push button 30 is released.

The illustrated system includes a circuit system parallel to heater 10, wherein alternating potentials between lines $L_1$, $L_3$ are rectified by rectifier 36 so that direct current (single-headed, full-line arrow) passes through a predetermined portion 37–1 of an adjustable resistor 37, through the adjustable take-off element 38 of this resistor and then through a conductor 39, said direct current then passing through coil 28–1 of relay 28 and therefrom through the closed thermostat 25 to $L_3$ as shown. It should be noted that the adjustment of resistor portion 37–1 by slider, 38 is such that this direct current can keep relay coil 28–1 energized but that it cannot by itself operate the relay to bring about a reversal of the indicated normal position of relay switch poles 32, 34.

As a result of these initial operations, fabrics are tumbled in the dryer drum by motor 20 and are simultaneously heated to gradually rising temperatures by heater 10. Rising temperatures are therefore encountered in the machine, for example in the exhaust air; these latter temperatures are schematically indicated by curve T in FIGURE 3. When these exhaust air temperatures have reached a level N, well over the initial ambient temperature but still below the cycling temperature levels to be considered presently, the cool-down thermostat 26 closes and thereby makes motor 20 independent of the capacitor-actuated relay 28. Meanwhile the tumbling and heating of the fabrics continues and curve T continues to rise; as known to the art this curve passes through a relatively flat portion, as the initial heating of wet fabrics progresses, and then begins to rise more rapidly, as the free humidity retained in the fabrics begins to disappear.

When a predetermined high temperature has been reached in the exhaust air stream (point A), cycling thermostat 25 (FIGURE 4) opens. It thereby instantly de-energizes heater 10, whereupon exhaust air temperatures T begin to drop as shown in FIGURE 3 between A and B. This new condition of the control system—prevailing while thermostat 25 is open, heater 10 is de-energized, and the temperatures drop—is best shown by FIGURE 5. No current flows through the heater during this cool-down phase, while alternating current continues to flow through the motor (M) and direct current potential continues to be applied across condensor 27. This cool-down condition continues until predetermined low temperature has been reached, at which moment the cycling thermostat 25 returns to closed condition, the heater is re-energized thereby and exhaust air temperatures begin to rise again (B–C in FIGURE 3).

The invention takes advantage of the well-defined character of the short cool-down curve A–B. As initially stated, only limited accuracy of the desired dryness control for the fabrics was available when attempts were made for instance to effect such control by measuring the total duration of cycling operations or phases; this duration was dependent on widely varying conditions, such as the very different sizes, types and heat retentions of fabric loads. Nor was truly successful operation possible when controlling the operation in response to a measurement of the duration of one or several heating-up phases. Their inception was hard to detect in many instances, for instance because of the flat form of curve T between points N and A.

The cool-down measuring and integrating and dryer-controlling capacitor 27, provided according to the invention, is progressively charged during the entire duration of a cool-down phase, such as A–B, since control thermostat 25 opens at the inception of this phase. The previously established relay-holding current, through the coil of relay 28 is thus interrupted. Accordingly, the full direct-current voltage present in conductor 39, past resistor portion 37–1, appears across capacitor 27 resulting in a charge being rapidly accumulated therein, as suggested by the broken-line arrow in FIGURE 5. The resulting rise in capacitor voltage is indicated in FIGURE 3 by a potential curve P which rises toward an elevated point U as the air temperature (curve T) drops from point A to point B. The slope of the potential curve P depends on the setting of potentiometer adjustor 38, while the length of this curve in horizontal direction depends on the slope of curve T, that is, on the retention of humidity in the fabrics (aside from machine constants such as the heat output of heater 10). Accordingly, the shaded area below this sloping line represents the integration of the rate of drop of temperatures (A–B), which rate in turn is a function of said humidity retention.

When a relatively low point B, corresponding to a predetermined temperature level between A and N, has been reached by the air temperature in the exhaust system, cycling thermostat 25 closes again and heater 10 is thereby re-energized (FIGURE 6), which causes renewed rise of temperature curve T from B to C (FIGURE 3). This closing of the thermostat also causes a discharge of the accumulated voltage of capacitor 27, through the coil of relay 28, which discharge accordingly occurs at high point U of curve P, corresponding to low point B of curve T. However, the capacitor and relay circuits are so dimensioned and arranged (particularly, as shown, by adjustment of slider 38) that this discharge obtained at point U is still insufficient to energize relay 28 to such an extent as to reverse relay switch poles 32, 34.

Further cycling of heater 10, thermostat 25 and capacitor 27 occurs as the air temperature again reaches the predetermined, relatively high and then relatively low temperatures, at points C and D respectively, and subsequently again at points E and F respectively, said low temperatures again corresponding to high capacitor potentials V, W (FIGURE 3). Accordingly each time that the high temperature is attained, as at A or C or E, the cycling thermostat opens; the heater is de-energized; the capacitor begins to be charged; and the exhaust air temperatures begin to drop. Then again, each time that relatively low exhaust air temperatures are reached as at B or D or F, the heater is re-energized; the capacitor is discharged through the reclosed heater cycling thermostat; and higher temperatures again begin to be built up in the tumbling drum and its exhaust structure.

The invention takes advantage of a more particular feature of these consecutive cycles, said feature being shown by FIGURE 3 at and adjacent point X. The capacitor voltage cycles in potential curve P differ from the corresponding exhaust air temperature cycles in curve T not only in that the voltage rises while the temperature drops, and vice versa, but also with regard to the exact levels reached by each respective curve T and P during each successive cycle. In temperature curve T these levels are predetermined by the setting of the cycling thermostat 25; however, different mixtures of humidity and dry air are successively present in the air stream sensed by this thermostat, and the speed of attainment of these uniform temperatures differs correspondingly in consecutive cycles. More specifically, during early cycles there is more water vapor in the circulating air and the rise of air temperatures resulting from the normal energy input by heater 10 is relatively slow due to the resultant exchange of latent heat (the curve B–C is not very steep), whereas the corresponding rise in a subsequent cycle is relatively fast (curve D–E is steeper). Conversely the successive rates of cool-down A–B, C–D, E–F, etc., are progressively flatter due to the presence of less water vapor and correspondingly less latent heat. As a result of these several conditions, successive projections of the cool-down curves A–B, C–D, etc. on the horizontal base line of potential curve P tend to be progressively longer.

This last-mentioned condition in turn is utilized according to the invention in that the charging of capacitor 27 is thus caused to take place during progressively longer periods of time, in successive cool-down periods A–B, C–D, etc., while the speed or rate of charging of the capacitor, and the corresponding slope of potential curve P, is the same in all successive cool-down periods, being determined only by fixed or predetermined electric circuit constants. Successively higher end potentials U, V, W, etc. are therefore reached in consecutive cool-down cycles, as FIGURE 3 shows in an approximate way. In corresponding fashion, successively larger integrated sub-totals of electric capacitor charge are accumulated, one during each successive dryer-cooling cycle, these respective sub-totals of charge being represented by the several shaded areas below the curve P as already mentioned.

This latter increase has the effect that ultimately, as at X, a relatively large predetermined amount of capacitor charge is available, which is then discharged through the coil of relay 28 as thermostat 25 then closes (FIGURE 6) and which then finally operates this relay coil to reverse the relay switch. This discharge is suggested by the curved arrow in FIGURE 6. The relay then opens the circuit of heater 10 at 34, so that even the reclosing of thermostat 25 (which occurs as the system has cooled down to point H in FIGURE 3) no longer re-energizes the heater. Accordingly, the cycling of the heater then stops, in the "off" condition of the heater, and a final cool-down thus occurs wherein the exhaust air temperature falls to and below level N, causing cool-down thermostat 26 (FIGURE 6) to resume its normal open position and thus also to stop motor M as bypass circuit 31 is and remains interrupted at 32.

Pursuant to the described operation of relay 28, a suitably limited potential is maintained to keep the coil of this relay energized against the relay's tendency to return to its illustrated, normal position. For suitable control of this potential it is often desirable to connect the formerly open end of resistor 37 to $L_3$ by a conductor 40 which can be engaged by relay switch pole 32 while the relay is energized. In order to allow such operation it has further been found desirable to limit the possible downward shifting of slider 38, on resistor 37, by a stop means 41.

Referring finally to the modified diagram of FIGURE 7: in this case provision is made for heating of the fabrics by means of a gas heater 70 supplied with fuel through a gas pipe 71 equipped with a suitable valving and initing system 72 operated by a solenoid 73. In addition, a modified relay 74 and circuit for capacitor 75 is shown in this diagram, and such elements can also be used in an electric heating system. Adjustable resistor 76 is here interposed between line $L_1$ and rectifier 77, while an additional and fixed resistor 78 is interposed between that rectifier and the two parallel circuits, one of which again leads through the coil of the relay (74) while the other again leads to the capacitor (75). Initial "cycling" is performed by this system in substantially the same way as shown in FIGURE 3, up to phase G–H. When this latter point (H) is reached, the modified system not only disconnects the heater at switch pole 82, and the bypass (79) around the cool-down thermostat (83) at switch pole 81, but also establishes line potential in rectifier 77, by the last-mentioned switch pole 81, thereby insuring the availability of a predetermined potential drop for the coil of relay 74, unaffected by re-adjustments of the variable resistor 76 and of the capacitor charging characteristics controlled thereby.

As already mentioned, the rectified current normally flowing through the relay coil when the cycling thermostat is closed is sufficient to hold this relay, although it is not sufficient to operate it. This current, too, is finally terminated, as the motor has been stopped by the relay operation and the main switch has thereby been reopened; therefore, the relay is de-energized at the end of the operation and the relay switch poles are thus reset in their normal position shown in FIGURE 7.

While only two embodiments of the new control system have been described, it should be understood that the details thereof, or of the single dryer construction of FIGURES 1 and 2, are not to be construed as limitative of the invention, except insofar as is consistent with the scope of the following claim.

I claim:

Apparatus for drying laundered fabrics, comprising:
means for tumbling the fabrics and for passing a current of air through the tumbling fabrics; electrical heater means for heating said current of air before it passes through the fabrics; an outlet duct for further circulation of said current of air after it has passed through said fabrics;
thermostat switch means in series with said heater means, said switch means being so arranged in said duct that, when air in the duct drops to a predetermined relatively low temperature or rises to a predetermined relatively high temperature, the switch means cycles to heater energizing and de-energizing positions, respectively;
an electrical capacitor and, in series therewith, a plurality of parallel circuit branches, one of which includes a resistor and means for charging the capacitor through said resistor when said thermostat switch means is in heater de-energizing position; a relay coil in another of said parallel circuit branches for discharging the capacitor through said coil when said thermostat switch means assumes the heater energizing position; and relay switch means controlled by said relay coil and in series with said heater means.

References Cited by the Examiner

UNITED STATES PATENTS

| 2,588,789 | 3/1952 | Zinn | 317—151 |
|---|---|---|---|
| 2,645,744 | 7/1953 | Cassidy | 317—151 |
| 2,927,474 | 3/1960 | Peras | 317—151 |
| 3,028,680 | 4/1962 | Conlee | 34—45 |
| 3,037,296 | 6/1962 | Cooley | 34—45 |
| 3,045,993 | 7/1962 | Sidaris | 34—45 |
| 3,064,163 | 11/1962 | Smith | 317—151 |

FOREIGN PATENTS 877,553   9/1961   Great Britain.

OTHER REFERENCES

Electronics-Maytag Electronics Dryers, copy 1960, 11 pages.

WILLIAM F. O'DEA, *Primary Examiner.*

NORMAN YUDKOFF, *Examiner.*

D. A. TAMBURRO, *Assistant Examiner.*